US008929689B2

(12) United States Patent
Metz et al.

(10) Patent No.: US 8,929,689 B2
(45) Date of Patent: Jan. 6, 2015

(54) OPTICAL MODULATOR UTILIZING UNARY ENCODING AND AUXILIARY MODULATOR SECTION FOR LOAD BALANCING

(75) Inventors: Peter C. Metz, Macungie, PA (US); Bipin Dama, Bridgewater, NJ (US); Kalpendu Shastri, Orefield, PA (US)

(73) Assignee: Cisco Technology, Inc., San Jose, CA (US)

( * ) Notice: Subject to any disclaimer, the term of this patent is extended or adjusted under 35 U.S.C. 154(b) by 357 days.

(21) Appl. No.: 13/413,883

(22) Filed: Mar. 7, 2012

(65) Prior Publication Data

US 2012/0230626 A1    Sep. 13, 2012

Related U.S. Application Data

(60) Provisional application No. 61/450,497, filed on Mar. 8, 2011.

(51) Int. Cl.
*G02F 1/035* (2006.01)
*G02B 6/12* (2006.01)
*H04B 10/50* (2013.01)
*G02F 1/225* (2006.01)
*G02F 1/01* (2006.01)
*H04B 10/516* (2013.01)

(52) U.S. Cl.
CPC ............ *G02F 1/011* (2013.01); *H04B 10/5051* (2013.01); *G02F 1/225* (2013.01); *G02F 2001/0113* (2013.01); *H04B 10/516* (2013.01); *H04B 10/5053* (2013.01)
USPC ..................................... 385/3; 385/1; 385/14

(58) Field of Classification Search
None
See application file for complete search history.

(56) References Cited

U.S. PATENT DOCUMENTS

| | | | |
|---|---|---|---|
| 4,288,785 A * | 9/1981 | Papuchon et al. | 341/111 |
| 6,522,793 B1 | 2/2003 | Szilagyi et al. | |
| 7,277,603 B1 * | 10/2007 | Roberts et al. | 385/1 |
| 7,483,597 B2 | 1/2009 | Shastri et al. | |
| 7,515,778 B2 * | 4/2009 | Mosinskis et al. | 385/3 |
| 2008/0089634 A1 | 4/2008 | Mosinskis et al. | |
| 2009/0003841 A1 * | 1/2009 | Ghidini et al. | 398/186 |
| 2010/0316324 A1 | 12/2010 | Webster et al. | |
| 2010/0316391 A1 | 12/2010 | Shastri et al. | |
| 2011/0044573 A1 | 2/2011 | Webster et al. | |

FOREIGN PATENT DOCUMENTS

WO           02/091600 A2     11/2002
WO     WO 2011112360           9/2011

OTHER PUBLICATIONS

Radulov, "A Binary-to-Thermometer Decoder with Redundant Switching Sequences", International Symposium on Circuits and Systems, 2006, pp. 330-333.

(Continued)

*Primary Examiner* — Tina Wong
(74) *Attorney, Agent, or Firm* — Patterson + Sheridan, LLP

(57) ABSTRACT

An optical modulator is configured to include multiple modulating sections formed along each arm and create a unary-encoded optical output signal by driving the number of sections required to represent the data value being transmitted (e.g., three sections driven to represent the data value "3", four sections driven to represent the data value "4"). An auxiliary modulating section, isolated from the optical signal path, is included for creating a path for current flow in situations where only an odd number of modulating sections are required to represent the data. The activation of the auxiliary modulation section minimizes the current imbalance that would otherwise be present along a common node of the arrangement.

17 Claims, 7 Drawing Sheets

(56) References Cited

OTHER PUBLICATIONS

Chengwei, et al., "A Digital Programable Impedance Controller", VLSI Course Project, SOC 2004, pp. 1-14.

Tobias Ellermeyer et al: "DA and AD Converters in SiGe Technology: Speed and Resolution for Ultra High Data Rate Applications", 36th European Conference and Exhibition on Optical Communication: (ECOC 2010); Torino, Italy, Sep. 19-23, 2010, IEEE, Piscataway, NJ, USA, Sep. 29, 2010, pp. 1-6.

European Search Report for 12771735.3, Jul. 8, 2014.

* cited by examiner

OPTICAL MODULATOR UTILIZING UNARY ENCODING AND AUXILIARY MODULATOR SECTION FOR LOAD BALANCING

CROSS REFERENCE TO RELATED APPLICATIONS

This application claims the benefit of U.S. Provisional Application No. 61/450,497, filed Mar. 8, 2011 and herein incorporated by reference.

TECHNICAL FIELD

The present invention relates to optical modulators and, more particularly, to silicon-based optical modulators employing a unary encoding scheme with a multi-section modulator structure, including the use of an auxiliary modulator section to provide load balancing for all possible code patterns.

BACKGROUND OF THE INVENTION

For many years, external optical modulators have been made out of electro-optic material, such as lithium niobate. Optical waveguides are formed within the electro-optic material, with metal contact regions disposed on the surface of each waveguide arm. The application of a voltage to a metal contact will modify the refractive index of the waveguide region underneath the contact, thus changing the speed of propagation along the waveguide. By applying the voltage(s) that produce a π phase shift between the two arms, a nonlinear Mach-Zehnder modulator is formed. In particular, the optical signal is launched into the waveguide, and an electrical data signal input is applied to the contacts. The optical signal is phase modulated as it propagates along the arms to generate the output optical signal as a function of the applied electrical data signal input.

Although this type of external modulator has proven extremely useful, there is an increasing desire to form various optical components, subsystems and systems on silicon-based platforms. It is further desirable to integrate the various electronic components associated with such systems (for example, the input electrical data drive circuit for an electro-optic modulator) with the optical components on the same silicon substrate. Clearly, the use of lithium niobate-based optical devices in such a situation is not an option. Various other conventional electro-optic devices are similarly made of materials (such as III-V compounds) that are not directly compatible with a silicon platform.

A significant advance has been made in the ability to provide optical modulation in a silicon-based platform, as disclosed in U.S. Pat. No. 6,845,198 issued to R. K. Montgomery et al. on Jan. 18, 2005, assigned to the assignee of this application and incorporated herein by reference. FIG. 1 illustrates an exemplary prior art silicon-based Mach-Zehnder interferometer (MZI) 1 that is configured to utilize silicon-based modulating devices 2 as described in the above-referenced Montgomery et al. patent. As shown, prior art MZI 1 comprises an input waveguide section 3 and an output waveguide section 4. A pair of waveguiding modulator arms 5 and 6 is shown, where in this example waveguide arm 5 is formed to include a modulating device 2, which may comprise a SISCAP device as disclosed in the Montgomery et al. arrangement, a silicon-based PN junction modulating device, or any other suitable silicon-based modulating arrangement.

In operation, an incoming continuous wave (CW) light signal from a laser source (not shown) is coupled into input waveguide section 3. The CW signal is thereafter split to propagate along waveguide arms 5 and 6. The application of an electrical drive signal to modulator 2 along arm 5 will provide the desired phase shift to modulate the optical signal, forming a modulated optical output signal along output waveguide 4. A pair of electrodes 7, 8 is illustrated in association with modulator 2 and used to provide the electrical drive signals ($V_{REF2}$, $V_{REF3}$). A similar modulating device may be disposed along waveguiding arm 6 to likewise introduce a phase delay onto the propagating optical signal. When operating in the digital domain, the electrodes may be turned "on" when desiring to transmit a logical "1" and then turned "off" to transmit a logical "0".

To the first order, the output power of a conventional MZI as shown above is given by the equation:

$$P_{out} = P_{in}/2(1+\cos \Delta\phi),$$

where $P_{out}$ is the output power from the MZI, $P_{in}$ is the input power, and $\Delta\phi$ is the net optical phase difference between the two arms (e.g., arms 5 and 6 of MZI 1 of FIG. 1). As a result, the optical output power level is controlled by changing the value of the net phase shift φ between the two arms. FIG. 2 is a plot of this relationship, illustrating the output power as a function of phase shift between the two arms (a "1" output associated with maximum output power $P_{out}$ and a "0" output associated with minimum output power $P_{out}$). That is, a differential phase shift between the two arms of the modulator provides either constructive interference (e.g., "1") or destructive interference (e.g., "0"). Although not shown or described, it is to be understood that in implementation such a modulator may utilize a DC section to optically balance the arms and set the operating point at a desired location along the transfer curve shown in FIG. 2, in this case allowing for a 2-bit data signal to be transmitted during each time period.

There have also been advances in the art of silicon-based optical modulators in terms of utilizing advanced signaling formats. See, for example, U.S. Pat. No. 7,483,597 issued to K. Shastri et al. on Jan. 27, 2009, assigned to the assignee of this application and herein incorporated by reference. As disclosed therein, a multi-bit electrical input data is used and the modulator itself is configured to include at least one modulator arm comprising multiple sections of different lengths, with the total length being equal to a π phase shift. One such exemplary modulator 10 is shown in FIG. 3. Each separate section is driven with a digital logic "1" or a digital logic "0", that is, digitally driven to either be "on" or "off", creating the multi-level modulation.

In one embodiment of this arrangement, the modulator sections are optimized in terms of nominal length to provide nearly equal power levels in absolute value, regardless of the position of the section along the modulator arm (i.e., its "position" relative to the cosine-based power curve). Referring again to the transfer function curve of FIG. 2, it is clear that longer length modulation sections can be used to operate at the peak and valley of the cosine curve to provide the same output power change as sections associated with the "steeper", central area of the transfer curve.

While these arrangements are useful in forming optical modulators that can utilize advanced signaling formats, other less-complicated arrangements may be desirable in certain situations.

SUMMARY OF THE INVENTION

The present invention relates to optical modulators and, more particularly, to silicon-based optical modulators employing a unary encoding scheme, including the use of an auxiliary electrode element to provide load balancing for all possible code patterns.

In accordance with the present invention, the utilization of a unary encoded scheme allows for an optical modulator to include a plurality of N modulator sections of essentially the same length, since the encoding only depends upon controlling the cumulative number of sections required to define the data bit to be transmitted (particularly true when operated in the linear region of the curve shown in FIG. 2).

A unary encoding scheme (also referred to in the art as "thermometer encoding") is a straightforward coding technique where an input data signal of value "x" is defined by a string of x 1's within a total number of M encoded bits. For example, an input data signal of value "8" is represented as a string of 8 1's (followed by a 0 to indicate the end of the string). Similarly, an input data signal of value "2" would be represented by a pair of 1's followed by a 0, and the like. The following table illustrates unary coding as applied to system having a 3-bit digital input (thus requiring M=$2^3$ separate output signals).

| Input Data Signal (digital representation) | Unary Encoded representation |
|---|---|
| 000 | 0 |
| 001 | 10 |
| 010 | 110 |
| 011 | 1110 |
| 100 | 11110 |
| 101 | 111110 |
| 110 | 1111110 |
| 111 | 11111110 |

It is an advantage of the unary encoded-based optical modulator that a simplified fabrication process can be used to form the modulator, since each modulator section is of substantially the same length and thus requires essentially the same size electrical driving circuit (as opposed to prior arrangements where "longer" modulator sections require a more powerful driving circuit in order to provide the desired free carrier movement).

It has been discovered that when driving only an odd number of modulator sections, a current imbalance will result that creates a voltage perturbation (noise) along the modulator signal path. Thus, in accordance with an aspect of the present invention, an auxiliary modulating section is disposed adjacent to the modulator and energized in each instance that only an "odd" number of sections are being driving. The auxiliary section is isolated from the optical signal path so as to not affect the data signal being transmitted.

In one embodiment, the present invention discloses a silicon-based optical modulator for transmitting a unary-encoded digital data signal comprising: an input waveguiding section for receiving a continuous wave (CW) optical input signal, an input optical splitter, coupled to the output of the input waveguiding section for dividing the CW optical input signal into a pair of CW optical input signals, a pair of optical waveguides coupled to the outputs of the input optical splitter and forming a pair of modulator arms, a first plurality of N modulating sections disposed along a first modulator arm of the pair of modulator arms, a second plurality of N modulating sections disposed along a second, remaining modulator arm of the pair of modulator arms, a plurality of drivers, coupled to the first and second pluralities of N modulating sections, said plurality of drivers responsive to input signals representing a unary-encoded data signal for turning "on" and "off" various ones of the separate modulating sections as required to contribute a desired phase shift to the propagating optical signal, an output optical combiner for combining the pair of phase-shifted propagating optical signals into a unary-encoded modulated optical output signal and an output waveguiding section coupled to the output optical combiner for supporting the propagation of the unary-encoded modulated optical output signal.

In another embodiment, the present invention further comprises an auxiliary modulating section and associated driver, the auxiliary modulating section isolated from the optical signal path and the associated driver activated to turn "on" the auxiliary modulating section in cases where an odd number of drivers are turned "on", the presence of the auxiliary modulating section creating a return path for current flow and reducing imbalance related thereto within the optical modulator.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 4:
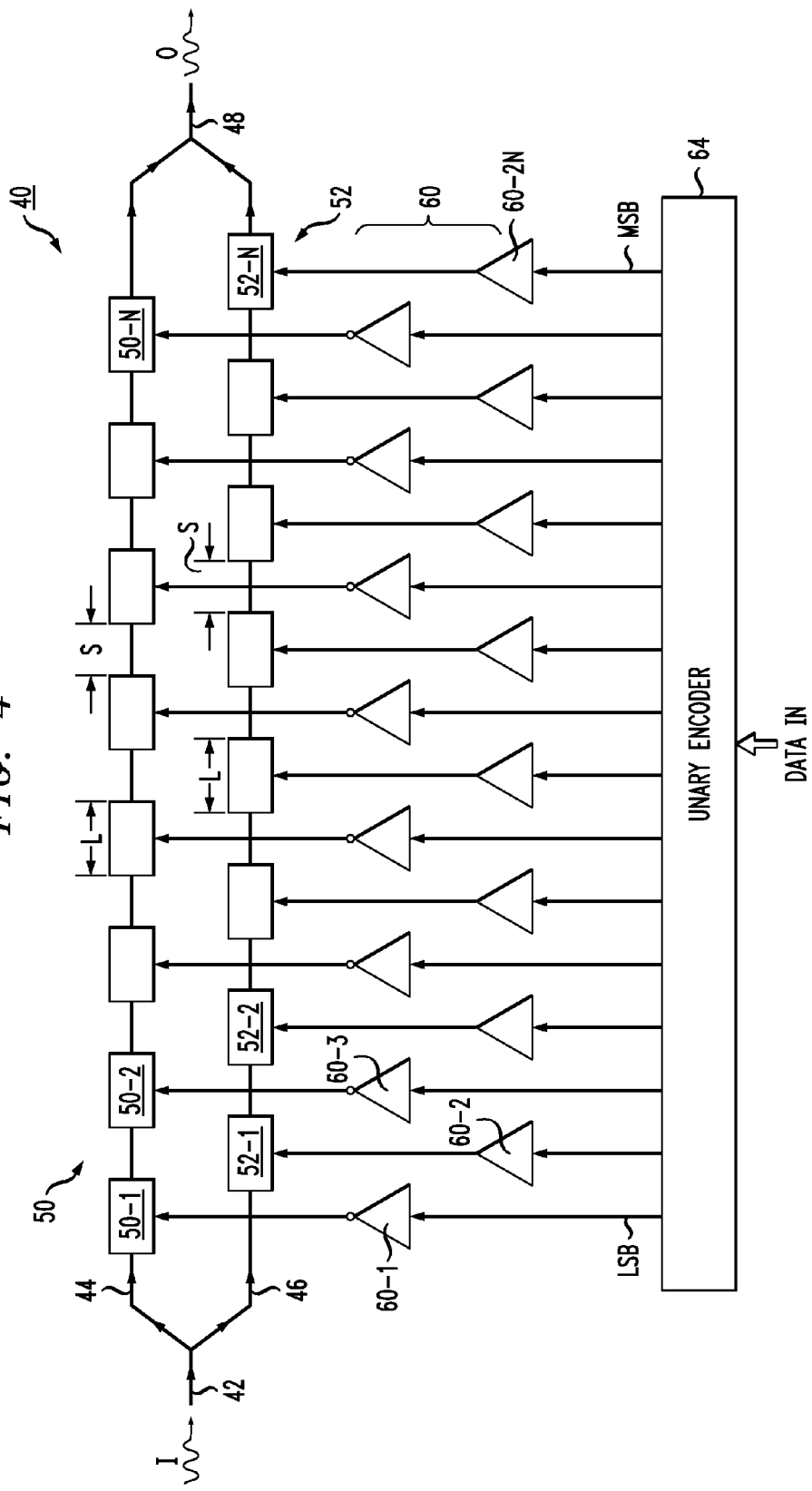
FIG. 4 illustrates an exemplary unary-encoded optical modulator.

FIG. 4 illustrates an exemplary Mach Zehnder interferometer (MZI) 40 formed to utilize unary encoding in accordance with the present invention. As shown, MZI 40 comprises an input optical waveguide 42 for receiving an input signal I from an optical source (either a pulse or CW signal). Input waveguide 42 thereafter splits into a pair of parallel waveguide arms 44 and 46, with a portion of the input optical signal propagating along each waveguide arm. An output waveguide 48 is disposed to combine the output signals from the pair of parallel waveguide arms 44 and 46 to form a modulated optical output signal O.

Figure 1:
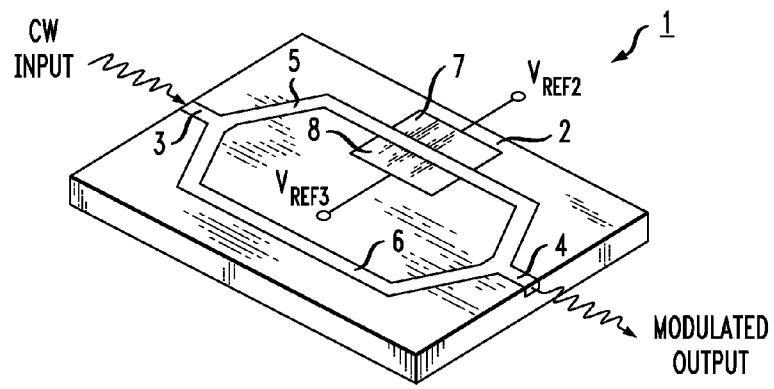
FIG. 1 is an isometric view of an exemplary prior art Mach-Zehnder interferometer-type optical modulator.
Figure 2:
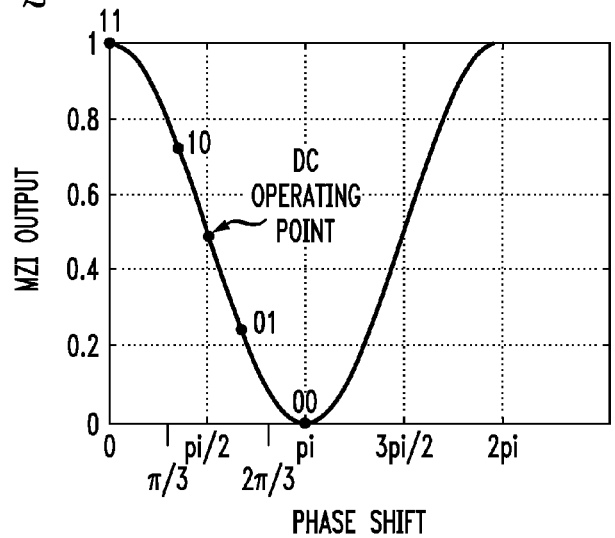
FIG. 2 is a plot of output power of an exemplary MZI-type modulator.
Figure 3:
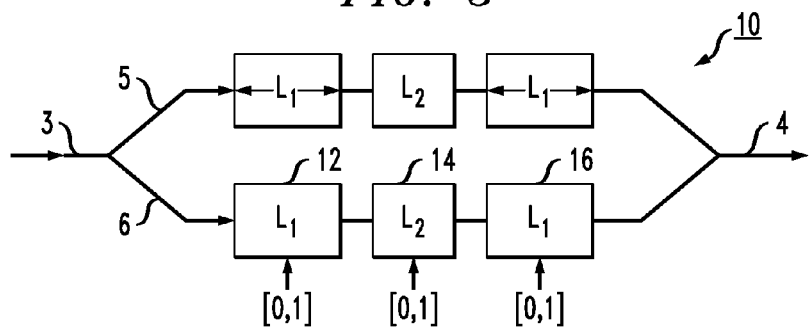
FIG. 3 is a diagram of a segmented MZI modulator.

MZI 40 further comprises a first plurality of N modulating sections 50 that are disposed along waveguide arm 44 and a second plurality of N modulating sections 52 are disposed along waveguide arm 46. As seen by reference to FIG. 4, each modulating section is of essentially the same length L and the inter-section spacing S is essentially the same as well. As mentioned above, the use of a unary encoding scheme allows for the physical dimensions of modulating sections 50 and 52 to be essentially uniform (particularly when operating along the interior, linear portion of the curve as shown in FIG. 2). A plurality of 2N drivers 60 is shown as used to provide electrical digital input signals to both the plurality of N modulating sections 50 and the plurality of N modulating sections 52, where drivers 60 and modulating sections 50 and 52 are associated in a one-to-one relationship. That is, a first driver 60-1 is used to apply a digital electrical input signal to modulating section 50-1, a second driver 60-2 is used to apply a digital electrical input signal to modulating section 52-1, a third driver 60-3 is used to apply a digital electrical input signal to modulating section 50-2, and so on, with driver 60-2N used to apply a digital electrical input signal to modulating section 52-N.

Figure 5:
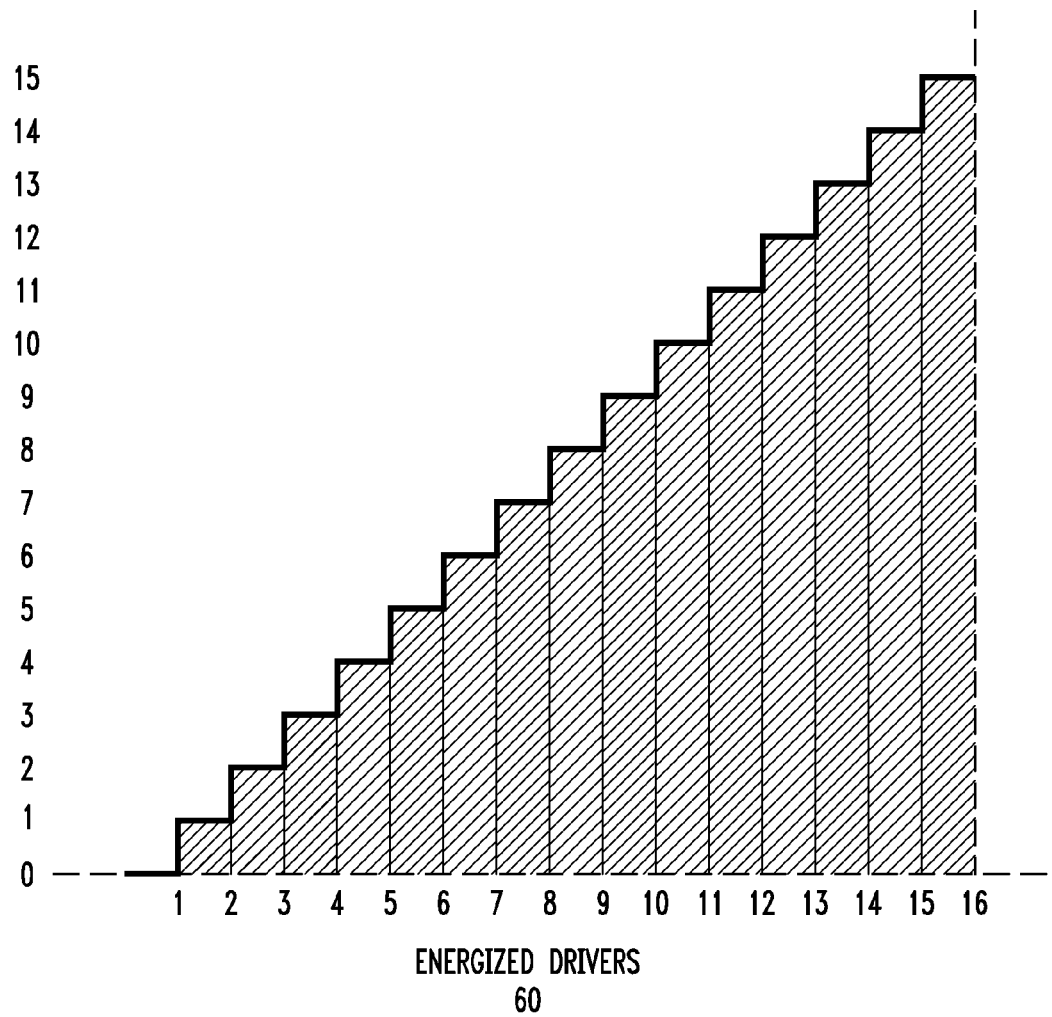
FIG. 5 is a graph depicting the relationship between an input data signal and a unary-encoded output.

As described above, a unary encoding scheme allows for an input data signal ranging in value from 1 to M (or, alternatively, ranging value from 0 to the value of M−1) to be transmitted by controlling the number drivers that are energized. For example, to transmit a data signal of value "1", driver 60-1 may be turned "on" (energized), with the remaining drivers 60-2 through 60-2N being "off" (de-energized). To transmit a data signal of value "2", drivers 60-1 and 60-2 will be turned "on", with the remaining drivers being "off". A graph depicting an exemplary arrangement between energized drivers and data values is shown in FIG. 5, which is representative of the encoding used with the particular embodiment of FIG. 4 (i.e., including eight modulating sections along each arm of the MZI). Table 1, below, depicts the unary coding scheme in tabular form for the value 2N=16.

supplying current to separate modulating sections, an imbalance results. Using the relationships shown in FIG. 5 and Table I, it can be concluded that each time the input electrical data signal has an "odd" value, an odd number of drivers will be energized and a current imbalance situation will arise (it is to be understood that the logic can be easily reversed to form the complementary situation where an input electrical data signal of "even" value is associated with an odd number of drivers; for the purposes of explanation, the following discussion will focus on the "odd value"/"odd number of drivers" configuration).

Figure 6:
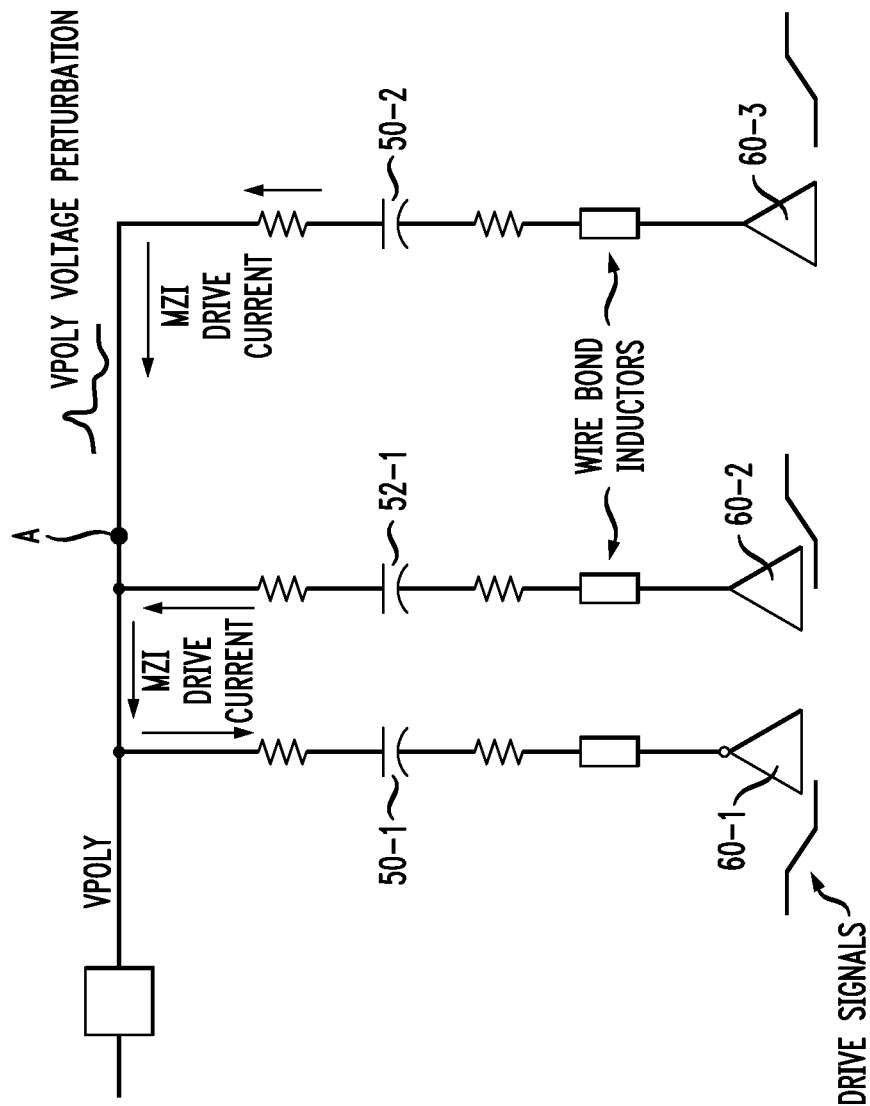
FIG. 6 is a diagram illustrating current flow for both an "even" data input signal and an "odd" data input signal, using a unary encoding scheme, illustrating the creation of current imbalance in the presence of an "odd" input signal.

The creation of a current imbalance is clearly depicted in the diagram of FIG. 6, which illustrates both the energizing of a pair of drivers 60-1 and 60-2 to represent an electrical input data value of "2" and the energizing of an additional third driver (60-3) to represent an electrical input data value of "3". The encoding for both "2" and "3" are bolded in Table I, for the sake of illustration. For the case of transmitting a data value of "2", the drive current will pass through modulating section 52-1, enter the common node A (for example, a polysilicon layer of an SOI-based modulator) and be directed back out through modulating section 50-1 (as a result of the complementary structure of modulating sections). Thus, the current completely circulates through the structure and there is no current imbalance or residual voltage appearing at common node A.

In contrast, when the electrical input data signal has a value of "3", encoder 64 will energize drivers 60-1, 60-2 and 60-3, which results in creating a current imbalance. As with the situation for transmitting a data signal of value "2", the path through modulating sections 52-1 and 50-1 will provide a flow for current. However, in order to create an input signal of value "3", driver 60-3 will also inject current into MZI 40 to turn "on" modulating section 50-2, as shown in FIG. 6. In this

TABLE I

| Input Data Signal D | Driver 60-1 | Driver 60-2 | Driver 60-3 | | | | | | | | | | | | | Driver 60-16 |
|---|---|---|---|---|---|---|---|---|---|---|---|---|---|---|---|---|
| 0 (0000) | 0 | 0 | 0 | 0 | 0 | 0 | 0 | 0 | 0 | 0 | 0 | 0 | 0 | 0 | 0 | 0 |
| 1 (0001) | 1 | 0 | 0 | 0 | 0 | 0 | 0 | 0 | 0 | 0 | 0 | 0 | 0 | 0 | 0 | 0 |
| 2 (0010) | 1 | 1 | 0 | 0 | 0 | 0 | 0 | 0 | 0 | 0 | 0 | 0 | 0 | 0 | 0 | 0 |
| 3 (0011) | 1 | 1 | 1 | 0 | 0 | 0 | 0 | 0 | 0 | 0 | 0 | 0 | 0 | 0 | 0 | 0 |
| 4 (0100) | 1 | 1 | 1 | 1 | 0 | 0 | 0 | 0 | 0 | 0 | 0 | 0 | 0 | 0 | 0 | 0 |
| 5 (0101) | 1 | 1 | 1 | 1 | 1 | 0 | 0 | 0 | 0 | 0 | 0 | 0 | 0 | 0 | 0 | 0 |
| 6 (0110) | 1 | 1 | 1 | 1 | 1 | 1 | 0 | 0 | 0 | 0 | 0 | 0 | 0 | 0 | 0 | 0 |
| 7 (0111) | 1 | 1 | 1 | 1 | 1 | 1 | 1 | 0 | 0 | 0 | 0 | 0 | 0 | 0 | 0 | 0 |
| 8 (1000) | 1 | 1 | 1 | 1 | 1 | 1 | 1 | 1 | 0 | 0 | 0 | 0 | 0 | 0 | 0 | 0 |
| 9 (1001) | 1 | 1 | 1 | 1 | 1 | 1 | 1 | 1 | 1 | 0 | 0 | 0 | 0 | 0 | 0 | 0 |
| 10 (1010) | 1 | 1 | 1 | 1 | 1 | 1 | 1 | 1 | 1 | 1 | 0 | 0 | 0 | 0 | 0 | 0 |
| 11 (1011) | 1 | 1 | 1 | 1 | 1 | 1 | 1 | 1 | 1 | 1 | 1 | 0 | 0 | 0 | 0 | 0 |
| 12 (1100) | 1 | 1 | 1 | 1 | 1 | 1 | 1 | 1 | 1 | 1 | 1 | 1 | 0 | 0 | 0 | 0 |
| 13 (1101) | 1 | 1 | 1 | 1 | 1 | 1 | 1 | 1 | 1 | 1 | 1 | 1 | 1 | 0 | 0 | 0 |
| 14 (1110) | 1 | 1 | 1 | 1 | 1 | 1 | 1 | 1 | 1 | 1 | 1 | 1 | 1 | 1 | 0 | 0 |
| 15 (1111) | 1 | 1 | 1 | 1 | 1 | 1 | 1 | 1 | 1 | 1 | 1 | 1 | 1 | 1 | 1 | 1 |

A unary encoder 64 is illustrated in FIG. 4 and is used to translate the received electrical input data signal D into the proper unary code (using, for example, the relationships shown in Table I), where the output from unary encoder 64 comprises a set of 2N signal paths that are applied as separate inputs to the plurality of 2N drivers 60. As shown, the least significant bit (LSB) output from unary encoder 64 is applied as the input to driver 60-1 and the most significant bit (MSB) output from unary encoder 64 is applied as the input to driver 60-2N.

As a result of the unary encoding process, it follows that as long as an even number of drivers 60 is turned "on", a balanced current path exists along the modulating sections. However, for those cases where an odd number of drivers are case, there is no return path for the current injected by driver 60-3 and an imbalance results, creating a voltage perturbation at common node A as shown.

Figure 7:
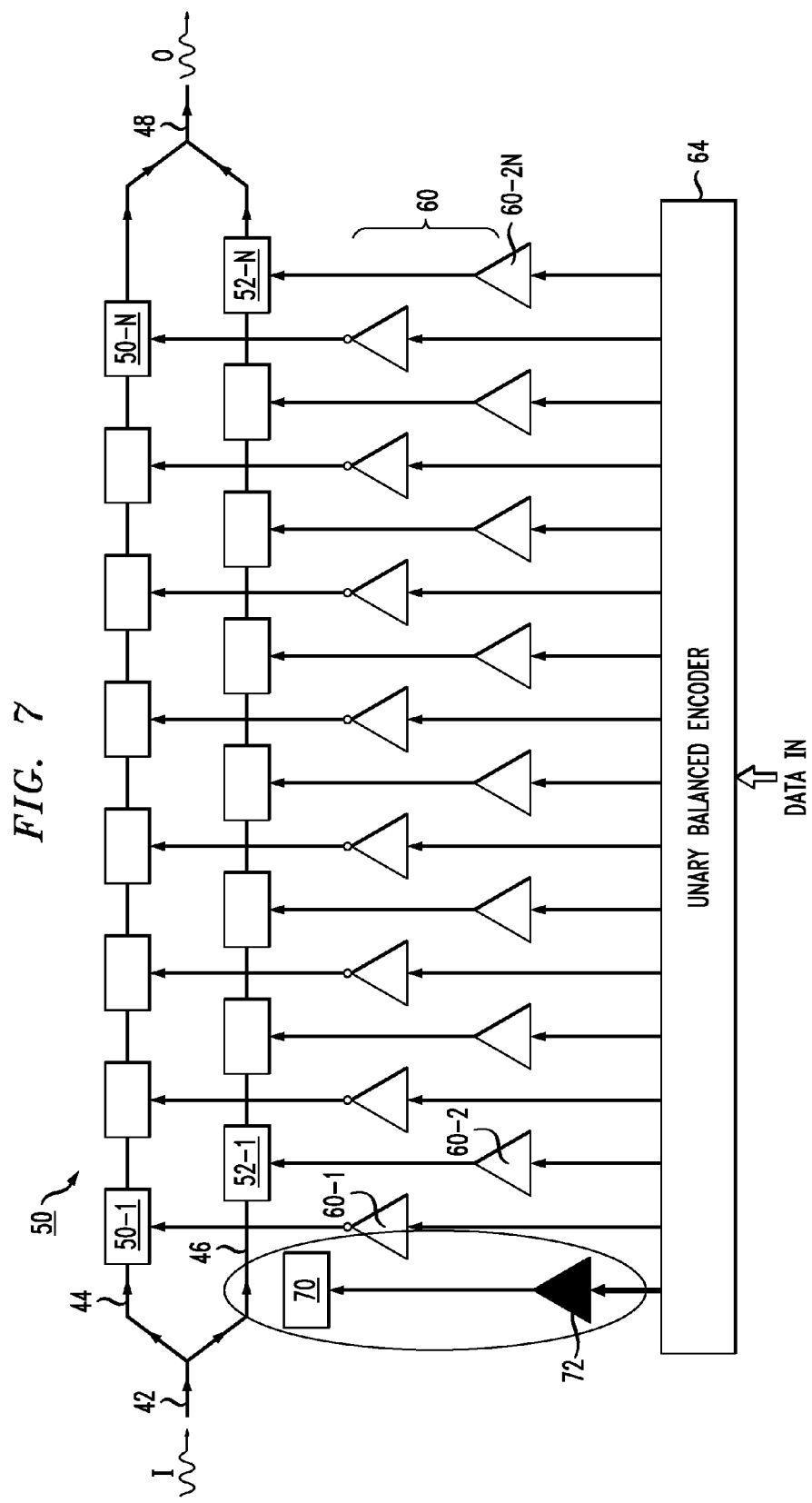
FIG. 7 is a current-balanced arrangement of FIG. 4, formed in accordance with the present invention, to include an auxiliary modulating section that is activated in the presence of an "odd" input signal to eliminate the current imbalance.

In accordance with the present invention, this problem is overcome by including an auxiliary modulating section 70 in the MZI configuration to provide a path for current flow during the transmission of an "odd" value electrical input data signal. FIG. 7 illustrates an exemplary MZI configuration incorporating auxiliary modulation section 70. As shown, auxiliary modulating section 70 is disposed outside of the optical signal path so that it will not interfere with the modulated optical output signal. Instead, modulating section 70, as controlled by its associated driver 72 is configured to turn "on" every time an odd-valued data signal is being transmitted, providing a return path for current flow from the "odd" modulating section. Table II as shown below can be used to provide the proper encoding for encoder 64 in this scheme.

TABLE II

| Input Data Signal D | Driver 60-1 | Driver 60-2 | Driver 60-3 | | | | | | | | | | | Driver 60-16 | Aux Driver 72 |
|---|---|---|---|---|---|---|---|---|---|---|---|---|---|---|---|
| 0 (0000) | 0 | 0 | 0 | 0 | 0 | 0 | 0 | 0 | 0 | 0 | 0 | 0 | 0 | 0 | 0 |
| 1 (0001) | 1 | 0 | 0 | 0 | 0 | 0 | 0 | 0 | 0 | 0 | 0 | 0 | 0 | 0 | 1 |
| 2 (0010) | 1 | 1 | 0 | 0 | 0 | 0 | 0 | 0 | 0 | 0 | 0 | 0 | 0 | 0 | 0 |
| 3 (0011) | 1 | 1 | 1 | 0 | 0 | 0 | 0 | 0 | 0 | 0 | 0 | 0 | 0 | 0 | 1 |
| 4 (0100) | 1 | 1 | 1 | 1 | 0 | 0 | 0 | 0 | 0 | 0 | 0 | 0 | 0 | 0 | 0 |
| 5 (0101) | 1 | 1 | 1 | 1 | 1 | 0 | 0 | 0 | 0 | 0 | 0 | 0 | 0 | 0 | 1 |
| 6 (0110) | 1 | 1 | 1 | 1 | 1 | 1 | 0 | 0 | 0 | 0 | 0 | 0 | 0 | 0 | 0 |
| 7 (0111) | 1 | 1 | 1 | 1 | 1 | 1 | 1 | 0 | 0 | 0 | 0 | 0 | 0 | 0 | 1 |
| 8 (1000) | 1 | 1 | 1 | 1 | 1 | 1 | 1 | 1 | 0 | 0 | 0 | 0 | 0 | 0 | 0 |
| 9 (1001) | 1 | 1 | 1 | 1 | 1 | 1 | 1 | 1 | 1 | 0 | 0 | 0 | 0 | 0 | 1 |
| 10 (1010) | 1 | 1 | 1 | 1 | 1 | 1 | 1 | 1 | 1 | 1 | 0 | 0 | 0 | 0 | 0 |
| 11 (1011) | 1 | 1 | 1 | 1 | 1 | 1 | 1 | 1 | 1 | 1 | 1 | 0 | 0 | 0 | 1 |
| 12 (1100) | 1 | 1 | 1 | 1 | 1 | 1 | 1 | 1 | 1 | 1 | 1 | 1 | 0 | 0 | 0 |
| 13 (1101) | 1 | 1 | 1 | 1 | 1 | 1 | 1 | 1 | 1 | 1 | 1 | 1 | 1 | 0 | 1 |
| 14 (1110) | 1 | 1 | 1 | 1 | 1 | 1 | 1 | 1 | 1 | 1 | 1 | 1 | 1 | 1 | 0 |
| 15 (1111) | 1 | 1 | 1 | 1 | 1 | 1 | 1 | 1 | 1 | 1 | 1 | 1 | 1 | 1 | 1 |

Figure 8:
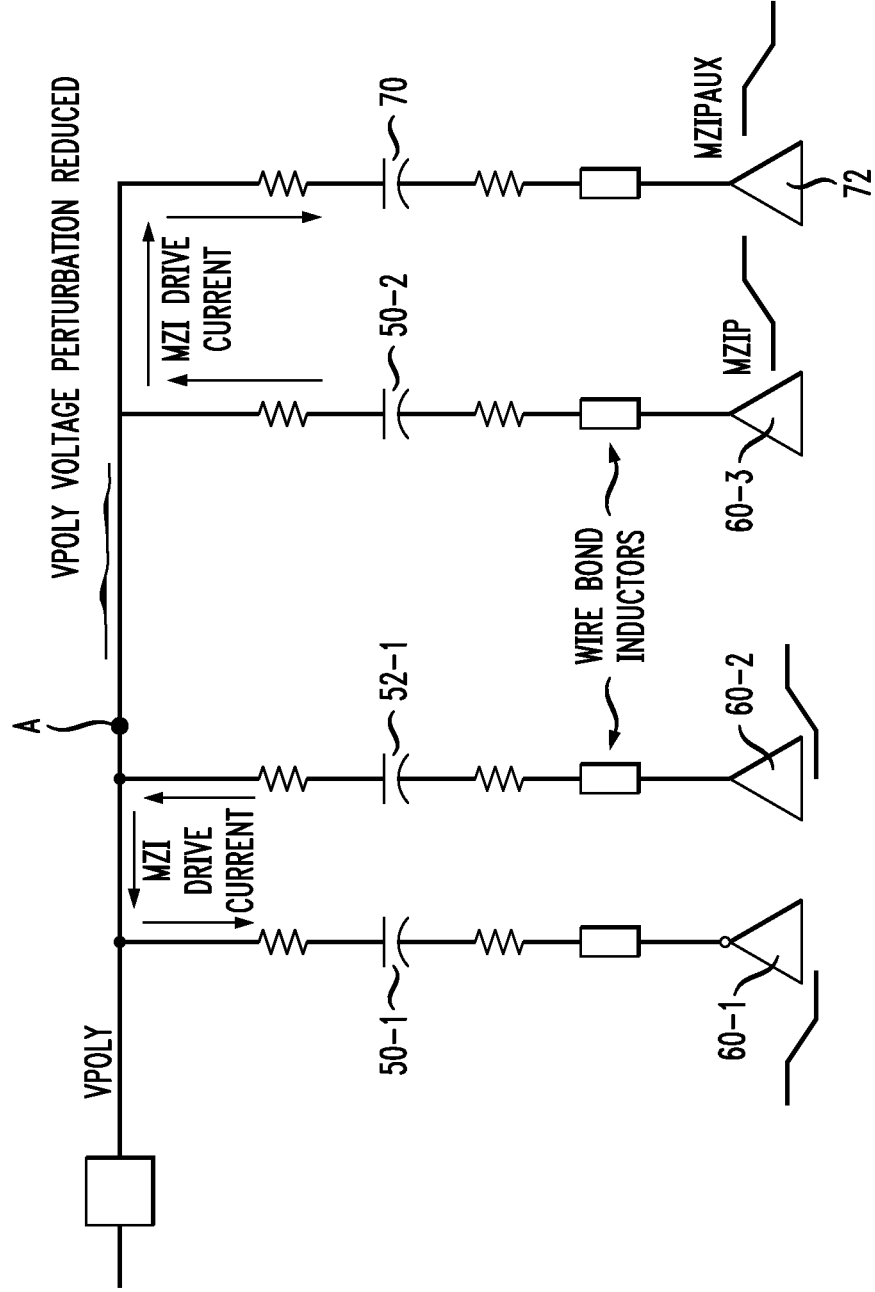
FIG. 8 is a diagram illustrating current flow when using an auxiliary modulating section in accordance with the present invention.

FIG. 8 contains a schematic diagram illustrating the creation of current balancing with the use of an auxiliary modulating section in accordance with the present invention. As with the diagram of FIG. 6, this arrangement is shown for the transmission of a data signal of value "3", where drivers 60-1 and 60-2 form part of a path for current flow with modulating sections 50-1 and 52-1. In accordance with the present invention, the addition of auxiliary modulating section 70 and driver 72 provide a return path for the current injected into the modulator through driver 60-3 and modulating section 50-2. As a result, the voltage perturbation at common node A is significantly reduced, as shown in FIG. 8.

Figure 9:
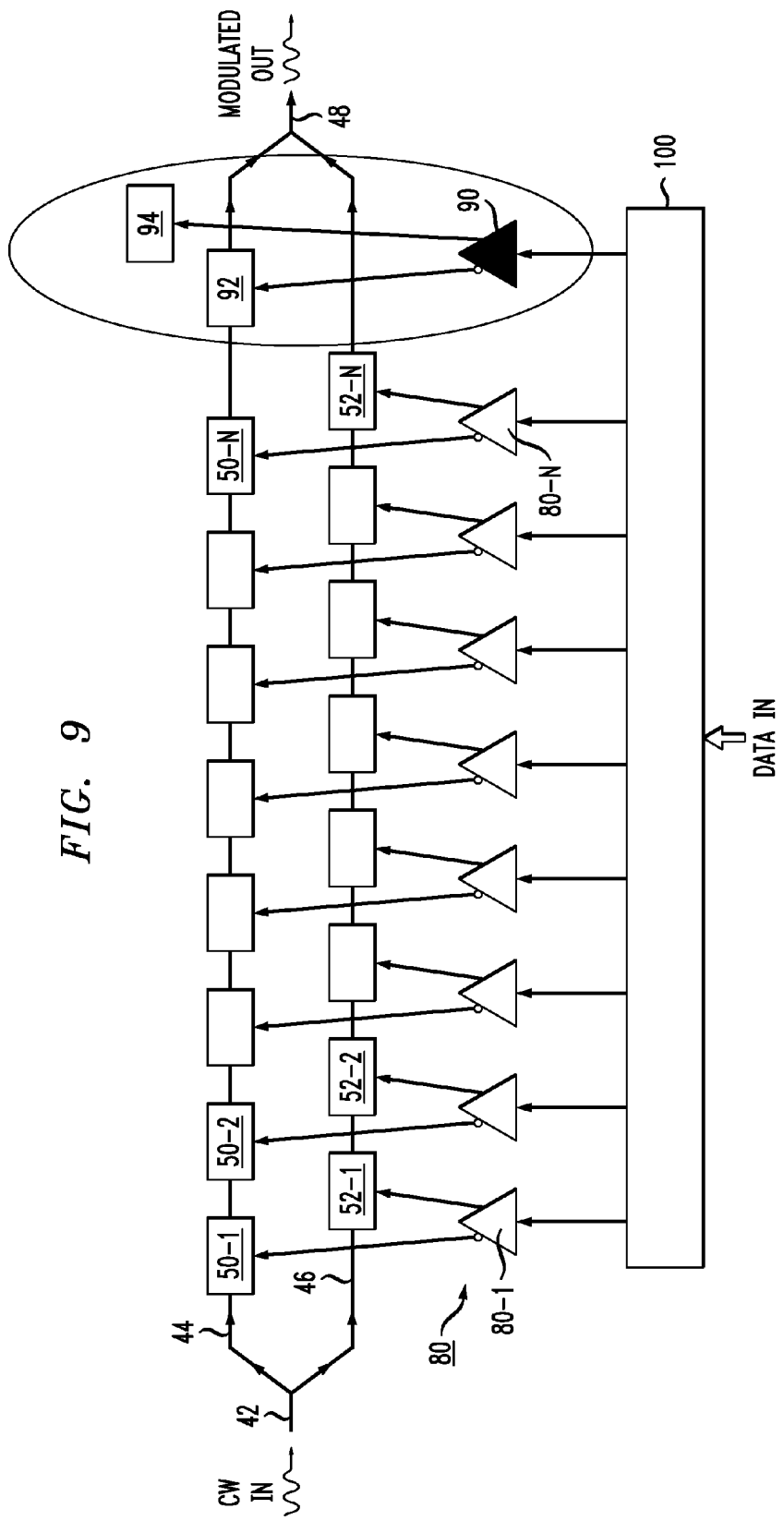
FIG. 9 illustrates an alternative, differentially-driven embodiment of the present invention, utilizing an auxiliary modulating section to mitigate the presence of a current imbalance when an odd number of modulating sections are energized.

It is also possible to utilize the unary encoding scheme with a differentially driven MZI structure. An exemplary configuration of a differential embodiment is shown in FIG. 9. In this arrangement, a plurality of differential drivers 80 is used to provide input signals to pairs of complementary modulating sections (for example, sections 50-1 and 52-1). A separate modulating section 92, in this case disposed along waveguiding arm 44, is used to create the odd data signal levels, with a separate driver 90 controlling modulating section 92. For this differentially-driven embodiment, a data signal of value "1" is created by energizing driver 90 to turn "on" modulating section 92. To create a data signal of value "2", driver 90 is de-energized and driver 80-1 is energized, turning "on" both modulating sections 50-1 and 52-1. Following along, a data signal value of "3" is then created by allowing driver 80-1 to remain energized, and then re-energizing driver 90. Thus, it is clear that in this embodiment, pairs of complementary-driven modulating sections are used to create the full set of "even" data signal values, with the addition of driver 90 and modulating section 92 used to create the full set of "odd" data signal values. An exemplary encoding scheme, for use by an encoder 100, is shown in Table III below:

TABLE III

| Input Data Signal D | Driver 80-1 | Driver 80-2 | Driver 80-3 | | | | | Driver 80-8 | Odd Signal Driver 90 |
|---|---|---|---|---|---|---|---|---|---|
| 0 (0000) | 0 | 0 | 0 | 0 | 0 | 0 | 0 | 0 | 0 |
| 1 (0001) | 0 | 0 | 0 | 0 | 0 | 0 | 0 | 0 | 1 |
| 2 (0010) | 1 | 0 | 0 | 0 | 0 | 0 | 0 | 0 | 0 |
| 3 (0011) | 1 | 0 | 0 | 0 | 0 | 0 | 0 | 0 | 1 |
| 4 (0100) | 1 | 1 | 0 | 0 | 0 | 0 | 0 | 0 | 0 |
| 5 (0101) | 1 | 1 | 0 | 0 | 0 | 0 | 0 | 0 | 1 |
| 6 (0110) | 1 | 1 | 1 | 0 | 0 | 0 | 0 | 0 | 0 |
| 7 (0111) | 1 | 1 | 1 | 0 | 0 | 0 | 0 | 0 | 1 |
| 8 (1000) | 1 | 1 | 1 | 1 | 0 | 0 | 0 | 0 | 0 |
| 9 (1001) | 1 | 1 | 1 | 1 | 0 | 0 | 0 | 0 | 1 |
| 10 (1010) | 1 | 1 | 1 | 1 | 1 | 0 | 0 | 0 | 0 |
| 11 (1011) | 1 | 1 | 1 | 1 | 1 | 0 | 0 | 0 | 1 |
| 12 (1100) | 1 | 1 | 1 | 1 | 1 | 1 | 1 | 0 | 0 |
| 13 (1101) | 1 | 1 | 1 | 1 | 1 | 1 | 1 | 0 | 1 |
| 14 (1110) | 1 | 1 | 1 | 1 | 1 | 1 | 1 | 1 | 0 |
| 15 (1111) | 1 | 1 | 1 | 1 | 1 | 1 | 1 | 1 | 1 |

Similar to the arrangements described above, the configuration as shown in FIG. 9 includes a correction for the current imbalance that is created when "odd" data values are transmitted (i.e., when driver 90 and modulating section 92 are activated). In this embodiment, an auxiliary modulating section 94 is included and is controlled by driver 90. Therefore, auxiliary modulating section 94 will turn "on" each time modulating section 92 is turned "on", creating a return path for the signal flow.

It is to be understood that the embodiments of the present invention as described above are intended to be exemplary only. The scope of the present invention is therefore intended to be limited only by the scope of the claims appended hereto.

What is claimed is:

1. A silicon-based optical modulator for transmitting a unary-encoded digital data signal, the modulator comprising:
   an input waveguiding section for receiving a continuous wave (CW) optical input signal;
   an input optical splitter, coupled to the output of the input waveguiding section for dividing the CW optical input signal into a pair of CW optical input signals;
   a pair of optical waveguides coupled to the outputs of the input optical splitter and forming a pair of modulator arms;
   a first plurality of N modulating sections disposed along a first modulator arm of the pair of modulator arms;
   a second plurality of N modulating sections disposed along a second, remaining modulator arm of the pair of modulator arms;
   a plurality of drivers, coupled to the first and second pluralities of N modulating sections, said plurality of drivers responsive to input signals representing a unary encoded data signal for selectively driving the pluralities of modulating sections to provide a predetermined phase shift to the pair of CW optical input signals propagating through the pair of modulator arms;
   an auxiliary modulating section that is isolated from the propagating CW optical input signals and that is coupled to an auxiliary driver, wherein the auxiliary driver selectively drives the auxiliary modulating section to reduce an electrical imbalance within the optical modulator;
   an output optical combiner for combining the pair of phase-shifted propagating optical input signals into a unary-encoded modulated optical output signal; and
   an output waveguiding section coupled to the output optical combiner for supporting the propagation of the unary-encoded modulated optical output signal.

2. The silicon-based optical modulator of claim 1, wherein each modulating section is of essentially a same length and adjacent modulating sections are separated by essentially a same spacing.

3. The silicon-based optical modulator of claim 1, wherein the auxiliary modulation section creates a return path for current flow, thereby reducing the electrical imbalance.

4. The silicon-based optical modulator of claim 1, wherein the plurality of drivers comprises a plurality of 2N drivers, each applied as a separate input to a respective modulating section of the first and second pluralities of N modulating sections in a one-to-one relationship.

5. The silicon-based optical modulator of claim 1, wherein the plurality of drivers comprise a plurality of N drivers, wherein each of the plurality of N drivers differentially controls a respective pair of modulating sections that includes a modulating section disposed along each of the pair of modulator arms, and wherein each pair of modulating sections forms a complementary configuration.

6. The silicon-based optical modulator of claim 1, further comprising a unary-encoder responsive to an input electrical data signal and generating a plurality of 2N output signals, representative of a 2N-level unary-encoded signal, each 2N output signal applied as an input to a separate respective driver of the plurality of drivers.

7. The silicon-based optical modulator of claim 1, wherein the auxiliary driver drives the auxiliary modulating section when an odd number of the pluralities of modulating sections are driven by the plurality of drivers, thereby creating an equal number of drive paths and return paths and reducing the electrical imbalance.

8. The silicon-based optical modulator of claim 1, wherein the electrical imbalance comprises one of a current imbalance and a residual voltage at a common node of the optical modulator.

9. The silicon-based optical modulator of claim 8, wherein the common node is a polysilicon layer of the optical modulator.

10. A method for modulating an optical signal using unary encoding, the method comprising:
    dividing a received continuous wave (CW) optical input signal into a pair of CW optical input signals, each of the pair of CW optical input signals propagating through respective modulator arms;
    using a plurality of drivers, and responsive to input signals representing a unary-encoded data signal, selectively driving a plurality of modulating sections disposed along each of the modulator arms to provide a predetermined phase shift to the pair of propagating CW optical input signals;
    selectively driving an auxiliary modulating section that is isolated from the propagating CW optical input signals to reduce an electrical imbalance caused by driving the plurality of modulating sections; and
    combining the pair of phase-shifted propagating CW optical input signals to create a unary-encoded modulated optical output signal.

11. The method of claim 10, wherein each of the modulator arms comprises a respective plurality of N modulating sections.

12. The method of claim 11, wherein the plurality of drivers comprises 2N drivers, and each of the 2N drivers provide input to a respective modulating section of the pluralities of N modulating sections in a one-to-one relationship.

13. The method of claim 11, wherein the plurality of drivers comprises N drivers, and each of the N drivers provides input to a respective pair of modulating sections of the plurality of modulating sections, each pair of modulating sections including a modulation section disposed along each of the modulating arms, and each pair of modulating sections forming a complementary configuration.

14. The method of claim 10, wherein selectively driving an auxiliary modulating section is performed by an auxiliary driver and comprises creating a return path using the auxiliary driver for current flow from at least one of the plurality of drivers, thereby reducing the electrical imbalance.

15. The method of claim 10, further comprising:
    generating, using a unary encoder and responsive to an input electrical data signal, a plurality of output signals; and
    applying each of the generated output signals as an input to a respective driver of the plurality of drivers.

16. The method of claim 10, wherein selectively driving an auxiliary modulating section comprises driving the auxiliary modulating section with an auxiliary driver when an odd number of the plurality of modulating sections are driven by the plurality of drivers, thereby creating an equal number of drive paths and return paths and reducing the electrical imbalance.

17. The method of claim 10, wherein the electrical imbalance comprises one of a current imbalance and a residual voltage at a common node of the plurality of modulating sections.

* * * * *

UNITED STATES PATENT AND TRADEMARK OFFICE
CERTIFICATE OF CORRECTION

PATENT NO. : 8,929,689 B2  
APPLICATION NO. : 13/413883  
DATED : January 6, 2015  
INVENTOR(S) : Metz et al.

Page 1 of 1

It is certified that error appears in the above-identified patent and that said Letters Patent is hereby corrected as shown below:

In the Claims:

Column 9, Claim 6, Line 58, please delete "separate".

Signed and Sealed this  
Ninth Day of June, 2015

Michelle K. Lee  
*Director of the United States Patent and Trademark Office*